United States Patent
Jensen

(10) Patent No.: US 6,488,340 B2
(45) Date of Patent: Dec. 3, 2002

(54) SIDE STIFFENING RAIL FOR A SIDE DUMP BODY

(75) Inventor: Layton W. Jensen, Thurston, NE (US)

(73) Assignee: Thurston Manufacturing Company, Thurston, NE (US)

( * ) Notice: Subject to any disclaimer, the term of this patent is extended or adjusted under 35 U.S.C. 154(b) by 0 days.

(21) Appl. No.: 09/826,573

(22) Filed: Apr. 5, 2001

(65) Prior Publication Data

US 2002/0145327 A1 Oct. 10, 2002

(51) Int. Cl.$^7$ .................................................. B60P 1/16
(52) U.S. Cl. ........................ 298/18; 298/17.6; 298/17.7
(58) Field of Search .............................. 298/17.5, 17.6, 298/17.7, 18, 13; 296/184, 187

(56) References Cited

U.S. PATENT DOCUMENTS

| | | | |
|---|---|---|---|
| 5,480,214 A | | 1/1996 | Rogers ....................... 298/17.6 |
| 5,597,211 A | * | 1/1997 | Golden ....................... 298/17.6 |
| 6,089,670 A | * | 7/2000 | Rogers .......................... 298/11 |
| 6,106,072 A | * | 8/2000 | Lutter, Jr. .................. 298/17.7 |
| 6,113,194 A | * | 9/2000 | Neufeld ...................... 298/17.7 |

* cited by examiner

Primary Examiner—Stephen T. Gordon
(74) Attorney, Agent, or Firm—Thomte, Mazour & Niebergall; Dennis L. Thomte

(57) ABSTRACT

A strengthening rail is provided for use on the side dump body of a side dump trailer or truck. A strengthening rail is positioned at the exterior surface of the side walls of the body at the upper ends thereof. Preferably, each of the rails includes a lip portion at the upper end thereof which is positioned adjacent the exterior surface of the respective side wall. An upper end portion extends downwardly and outwardly from the upper end of the lip portion and terminates in a first wall portion which extends downwardly therefrom at an acute angle with respective side wall. A second wall portion extends downwardly and inwardly from the lower end of the first wall portion and terminates in a third wall portion which extends inwardly to the respective side wall. The inner end of the third wall portion is welded full length to the respective side wall. The inner end of the upper end portion of the side rail is also welded full length to the respective side wall.

16 Claims, 2 Drawing Sheets

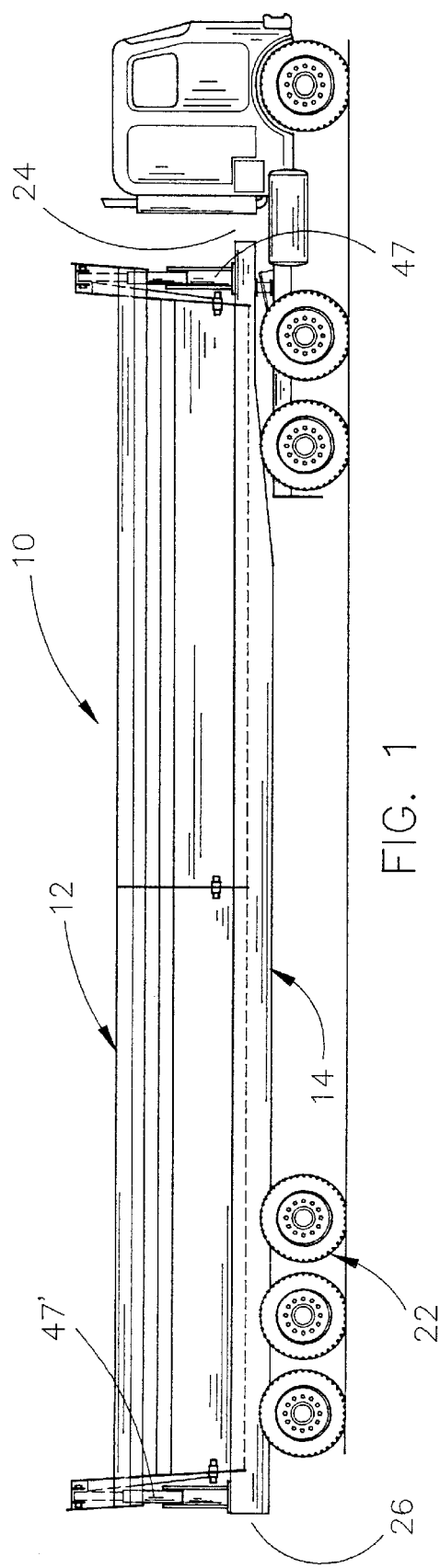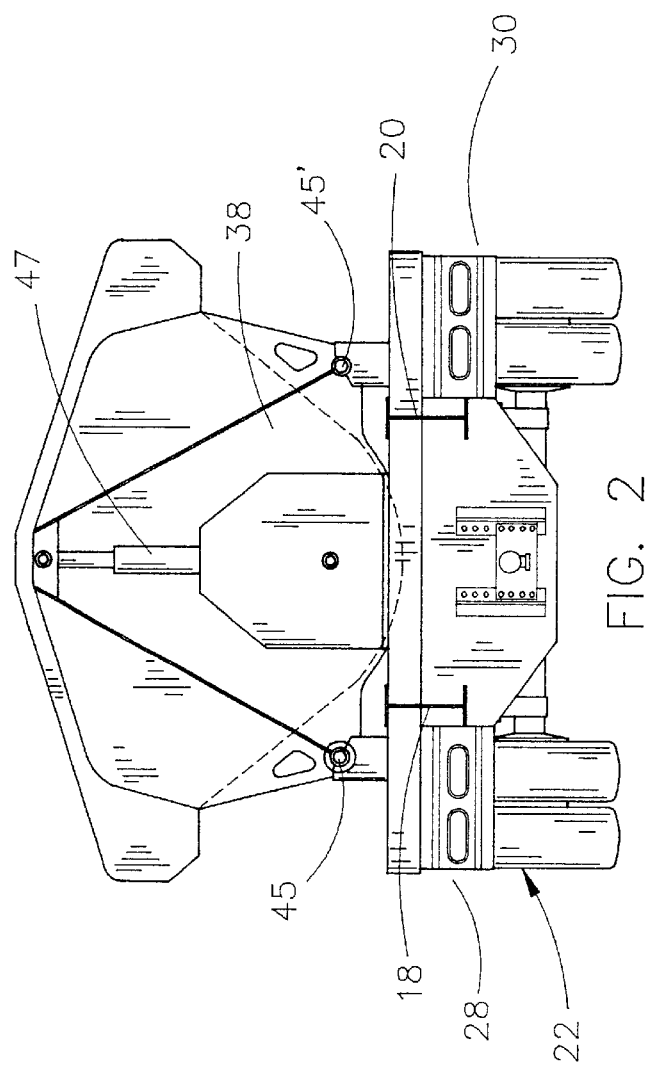

SIDE STIFFENING RAIL FOR A SIDE DUMP BODY

BACKGROUND OF THE INVENTION

1. Field of the Invention

This invention relates to a side dump body and more particularly to a side stiffening rail for a side dump body. Further, this invention relates to a side stiffening rail for a side dump body which utilizes less material than conventional side stiffening rails and which results in a stronger side dump body.

2. Description of the Related Art

Dump bodies which are employed on trailers or trucks normally are of the end dump type or the side dump type. Since the introduction of the side dump body disclosed in U.S. Pat. No. 5,480,214, side dump bodies and trailers have experienced wide acceptance. The side dump body such as disclosed in U.S. Pat. No. 5,480,214 normally comprises front and rear bulkheads joined together with sheets of metal to form a bottom wall and upwardly and outwardly extending side walls. In most cases, a pair of spaced-apart stiffening rails is utilized on each of the side walls for strengthening and stiffening purposes. The side stiffening rails employed on most prior art side dump bodies utilize considerable material.

SUMMARY OF THE INVENTION

A side stiffening rail is described for use with a side dump body which is mounted on a wheeled frame having a forward end, a rearward end, and first and second sides. A side dump body is movably mounted on the wheeled frame and has a rearward end, a forward end, and an open upper end. The side dump body includes a bottom wall having first and second side walls extending upwardly and outwardly from the outer ends thereof. The stiffening rail is secured to the exterior surface of each of the side rails at the upper end thereof for strengthening and stiffening the side dump body. Each of the stiffening rails comprises an elongated plate which has been bent to define an upper end portion, a first wall portion having upper and lower ends which extends downwardly from the upper end portion at an acute angle with respect to the plane of the respective side wall, a second wall portion having upper and lower ends which extends downwardly from the lower end of the first wall portion at an obtuse angle with respect thereto, and a third wall portion having first and second ends extending inwardly from the lower end of the second wall portion towards the respective side wall at an obtuse angle with respect to the second wall portion. The upper end portion is welded full length to the respective side wall. The second end of the third wall portion is welded full length to the respective side wall.

It is a principal object of the invention to provide a side stiffening rail for a side dump body.

A further object of the invention is to provide a side stiffening rail for a side dump body which requires less material than the prior art side stiffening rails, but which provides a stronger unit.

These and other objects will be apparent to those skilled in the art.

BRIEF DESCRIPTION OF THE DRAWINGS

FIG. 1 is a side view of a side dump body having the side stiffening rail of this invention utilized thereon;

FIG. 2 is a rear view of the side dump body of FIG. 1;

DESCRIPTION OF THE PREFERRED EMBODIMENT

Figure 3:
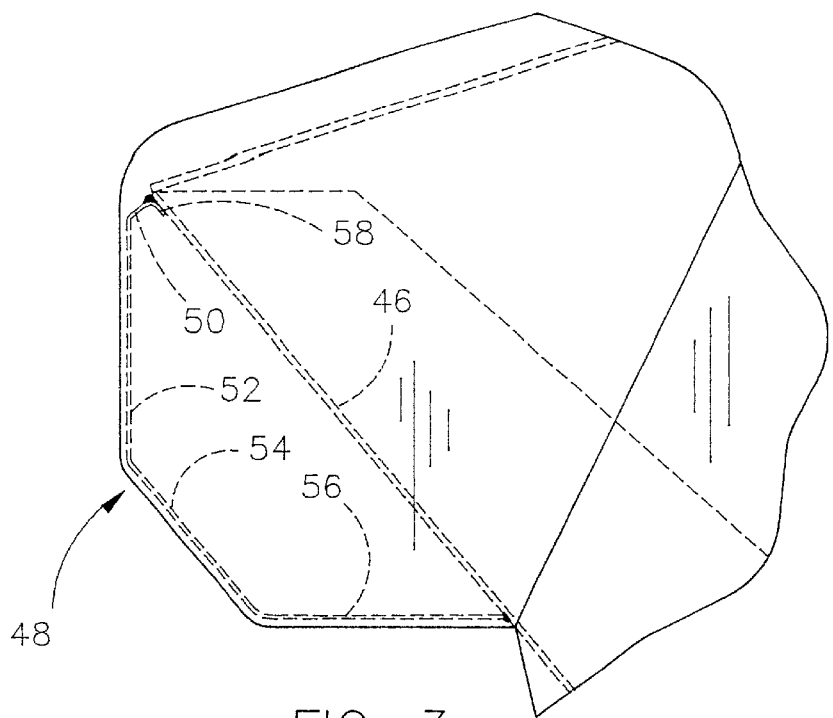
FIG. 3 is an end elevational view of one of the stiffening rails.
Figure 4:
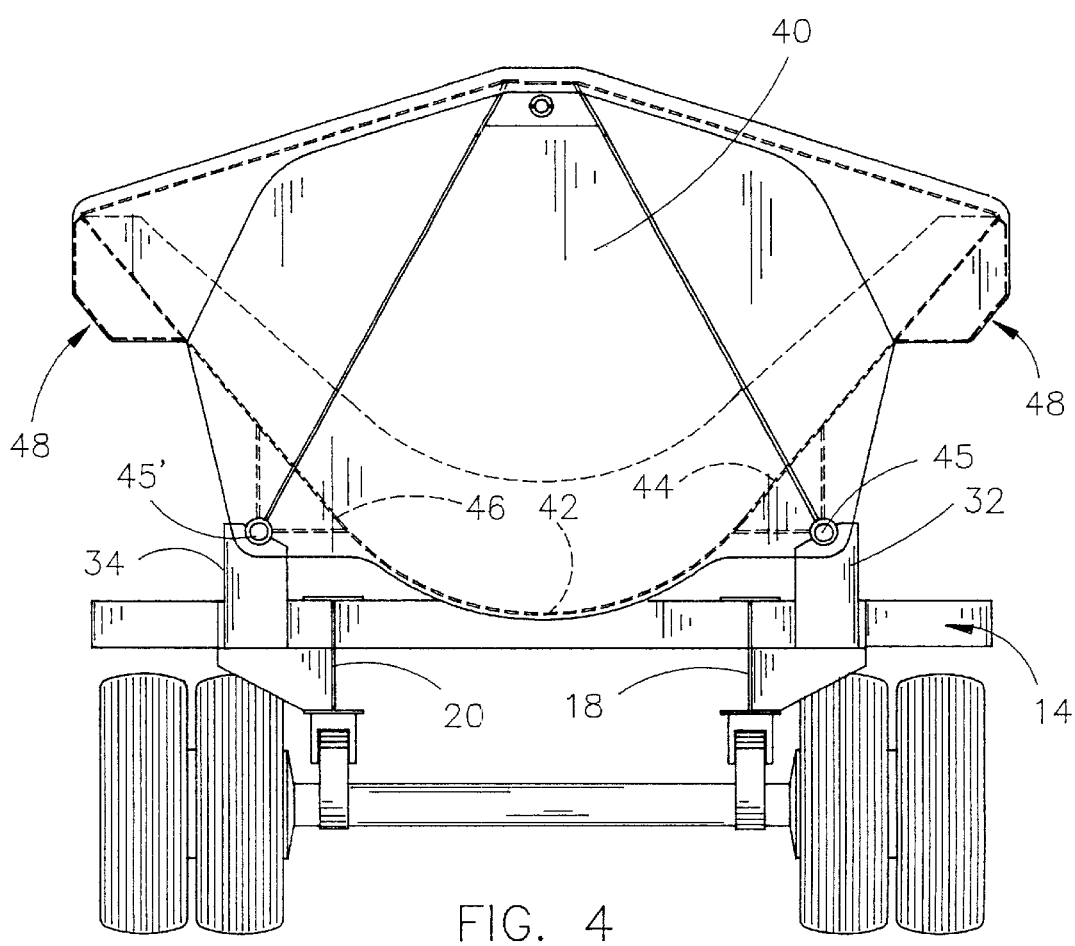
FIG. 4 is a partial front end elevational view of the side dump body of FIG. 1.

The reference numeral 10 refers generally to a side dump body trailer or truck which includes a side dump body or unit 12 pivotally mounted on a frame means 14. Frame means 14 normally comprises a pair of longitudinally extending frame members 18 and 20 which are conventionally supported on a running gear 22. For purposes of description, the frame means 14 will be described as including a forward end 24, a rearward end 26, and opposite sides 28 and 30. A plurality of horizontally spaced first supports 32 are secured to the wheeled frame at one side thereof while a plurality of spaced-apart second supports 34 are secured to the wheeled frame at the other side thereof.

Body 12 includes a rear bulkhead 38 and a front bulkhead 40. In some cases, an intermediate bulkhead will also be utilized. Body 12 includes a bottom wall portion 42 having side walls 44 and 46 extending upwardly and outwardly therefrom to define an open upper end. The exteriors of side walls 44 and 46 are provided with pivot pins 45 and 45', respectively, which are supported upon the supports 32 and 34, respectively. The rearward ends of side walls 44 and 46 abut against the rear bulkhead 38 while the forward ends of side walls 44 and 46 abut against the front bulkhead 40. The ends of the side walls 44 and 46 are welded to the bulkheads in conventional fashion. For purposes of description, the side walls 44 and 46 will be described as having interior and exterior surfaces. Hydraulic cylinders 47 and 47' are provided for moving the body from its transport position, to a dumping position.

The numeral 48 refers to the side stiffening rail of this invention which is secured to the exterior surface of each of the side walls 44 and 46 at the upper end thereof, as illustrated in the drawings. Rail 48 is formed from an elongated plate which has been bent to define an upper pend portion 50, a first wall portion 52 having upper and lower ends with the first wall portion 52 extending downwardly from the upper end portion 50 at an acute angle with respect to the plane of the respective side wall. Rail 48 also includes a second wall portion 54 which has upper and lower ends and which extends downwardly from the lower end of the first wall portion 52 at an obtuse angle with respect thereto. Rail 48 also includes a third wall portion 56 having first and second ends with the third wall portion 56 extending inwardly from the lower end of the second wall portion 54 towards the respective side wall at an obtuse angle with respect to the second wall portion 54. The upper end portion 50 is welded full length to the respective side wall, as illustrated in the drawings. The second end of the third wall portion 56 is welded full length to the respective side wall. Each of the rails 48 could be formed from a single piece of ten gauge steel material or could be formed of a plurality of sheet members joined together in an end-to-end relationship. Preferably, upper end portion 50 includes a downwardly extending lip portion 58 which is positioned adjacent the exterior surface of the respective side wall. Although the embodiment of the rail disclosed above is the preferred embodiment, in some cases, the lip portion 58 and the upper end portion 50 may be omitted with the upper end of the first wall portion 52 being in an abutting relationship with the exterior surface of the respective side wall and welded thereto.

Preferably, the rail 48 is formed from a length of sheet material having a width of twenty-four inches before breaking. Preferably, the distance between the upper end portion 52 and the inner end of the third wall portion is approximately 17.5 inches. Preferably, the distance between the exterior surface of the respective side wall and the second side wall 54 is approximately six inches. Preferably, upper end portion 40 extends upwardly from the upper end of the first wall portion 52 towards the respective side wall, as illustrated in the drawings.

The strengthening rail 48 of this invention provides a stronger unit than that disclosed in the prior art with less material being required to achieve that strengthening feature.

Thus it can be seen that the invention accomplishes at least all of its stated objectives.

I claim:

1. In combination:
   a wheeled frame having a forward end, a rearward end, a first side and a second side;
   a side dump body movably mounted on said wheeled frame and having a rearward end, a forward end and an open upper end;
   said side dump body including a bottom wall having first and second sides, a forward end and a rearward end; a first side wall extending upwardly and outwardly from said first side of said bottom wall; a second side wall extending upwardly and outwardly from said second side of said bottom wall; a rear wall secured to and extending between said bottom wall, said first side wall and said second side wall; a front wall secured to and extending between said bottom wall, said first side wall and said second side wall; the upper ends of said first side wall, said second side wall, said front wall and said rear wall defining said open upper end of said side dump body;
   each of said first and second side walls having interior and exterior surfaces and an upper end;
   a first power cylinder having a base end pivotally secured to said wheeled frame intermediate the sides thereof forwardly of said body and a rod end operatively pivotally secured to said front wall of said body intermediate the sides thereof;
   a second power cylinder having a base end pivotally secured to said wheeled frame intermediate the sides thereof rearwardly of said body and a rod end operatively pivotally secured to said rear wall of said body intermediate the sides thereof;
   means for simultaneously selectively extending the rods of said first and second power cylinders whereby said body may dump material therein from at least one side of said body;
   each of said first and second side walls having a stiffening rail mounted on the exterior surface thereof adjacent the upper end thereof;
   each of said stiffening rails comprising an elongated plate which has been bent to define a first wall portion, having upper and lower ends, which extends downwardly from the respective side wall at an acute angle with respect to a plane of the respective side wall; a second wall portion, having upper and lower ends, which extends downwardly from said lower end of said first wall portion at an obtuse angle with respect thereto; and a third wall portion, having first and second ends, extending inwardly from said lower end of said second wall portion towards the respective side wall at an obtuse angle with respect to said second wall portion;
   said upper end of said first wall portion being welded to the respective side wall;
   said second end of said third wall portion being welded to the exterior surface of the respective side wall.

2. The combination of claim 1 wherein said first wall portion is welded full length to the respective side wall.

3. The combination of claim 1 wherein said second end of said third wall portion is welded full length to the respective side wall.

4. The combination of claim 2 wherein said second end of said third wall portion is welded full length to the respective side wall.

5. The combination of claim 1 wherein said open upper end includes a downwardly extending lip portion which is positioned adjacent the exterior surface of the respective side wall.

6. The combination of claim 1 wherein said open upper end comprises a fourth wall portion, having inner and outer ends, which extends upwardly from said upper end of said first wall portion towards the respective side wall and a downwardly extending lip portion at said inner end of said fourth wall portion which is positioned adjacent the exterior surface of the respective side wall.

7. The combination of claim 6 wherein said upper end portion is welded to the respective side wall at the juncture of said fourth wall portion and said lip portion.

8. In combination:
   a wheeled frame having a forward end, a rearward end, a first side and a second side;
   a side dump body movably mounted on said wheeled frame and having a rearward end, a forward end and an open upper end;
   said side dump body including a bottom wall having first and second sides, a forward end and a rearward end; a first side wall extending upwardly and outwardly from said first side of said bottom wall; a second side wall extending upwardly and outwardly from said second side of said bottom wall; a rear wall secured to and extending between said bottom wall, said first side wall and said second side wall; a front wall secured to and extending between said bottom wall, said first side wall and said second side wall; the upper ends of said first side wall, said second side wall, said front wall and said rear wall defining said open upper end of said side dump body;
   each of said first and second side walls having interior and exterior surfaces and an upper end;
   a first power cylinder having a base end pivotally secured to said wheeled frame intermediate the sides thereof forwardly of said body and a rod end operatively pivotally secured to said front wall of said body intermediate the sides thereof;
   a second power cylinder having a base end pivotally secured to said wheeled frame intermediate the sides thereof rearwardly of said body and a rod end operatively pivotally secured to said rear wall of said body intermediate the sides thereof;
   means for simultaneously selectively extending the rods of said first and second power cylinders whereby said body may dump material therein from at least one side of said body;
   each of said first and second side walls having a stiffening rail mounted on the exterior surface thereof adjacent the upper end thereof;

each of said stiffening rails comprising an elongated plate which has been bent to define an upper end portion, a first wall portion, having upper and lower ends, which extends downwardly from said upper end portion at an acute angle with respect to a plane of the respective side wall; a second wall portion, having upper and lower ends, which extends downwardly from said lower end of said first wall portion at an obtuse angle with respect thereto; and a third wall portion, having first and second ends, extending inwardly from said lower end of said second wall portion towards the respective side wall at an obtuse angle with respect to said second wall portion;

said upper end portion being welded to the respective side wall;

said second end of said third wall portion being welded to the exterior surface of the respective side wall.

9. The combination of claim 8 wherein said upper end portion is welded full length to the respective side wall.

10. The combination of claim 8 wherein said second end of said third wall portion is welded full length to, the respective side wall.

11. The combination of claim 9 wherein said second end of said third wall portion is welded full length to the respective side wall.

12. The combination of claim 8 wherein said upper end portion includes a downwardly extending lip portion which is positioned adjacent the exterior surface of the respective side wall.

13. The combination of claim 8 wherein said upper end portion comprises a fourth wall portion, having inner and outer ends, which extends upwardly from said upper end of said first wall portion towards the respective side wall and a downwardly extending lip portion at said inner end of said fourth wall portion which is positioned adjacent the exterior surface of the respective side wall.

14. The combination of claim 13 wherein said upper end portion is welded to the respective side wall at the juncture of said fourth wall portion and said lip portion.

15. The combination of claim 8 wherein said stiffening rail is comprised of 10 gauge steel.

16. The combination of claim 1 wherein said body has only one said stiffening rail secured to each of said side walls.

* * * * *